(No Model.) 2 Sheets—Sheet 2.
C. D. WOOLEY.
CAR COUPLING.
No. 346,630. Patented Aug. 3, 1886.
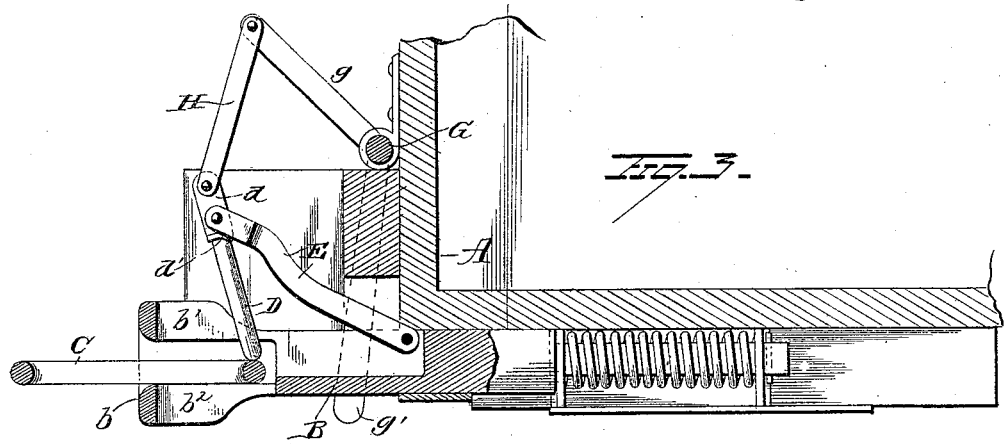
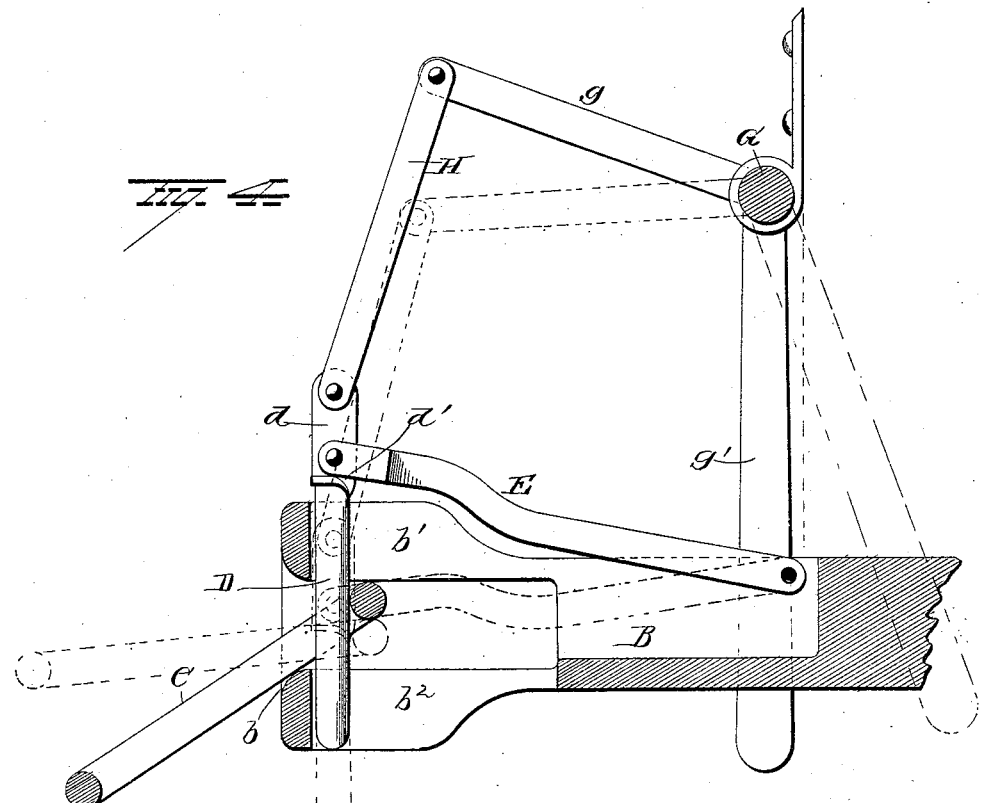
WITNESSES
N. E. Jones
Geo. F. Downing
INVENTOR
Chas. D. Wooley
By H. A. Seymour
Attorney

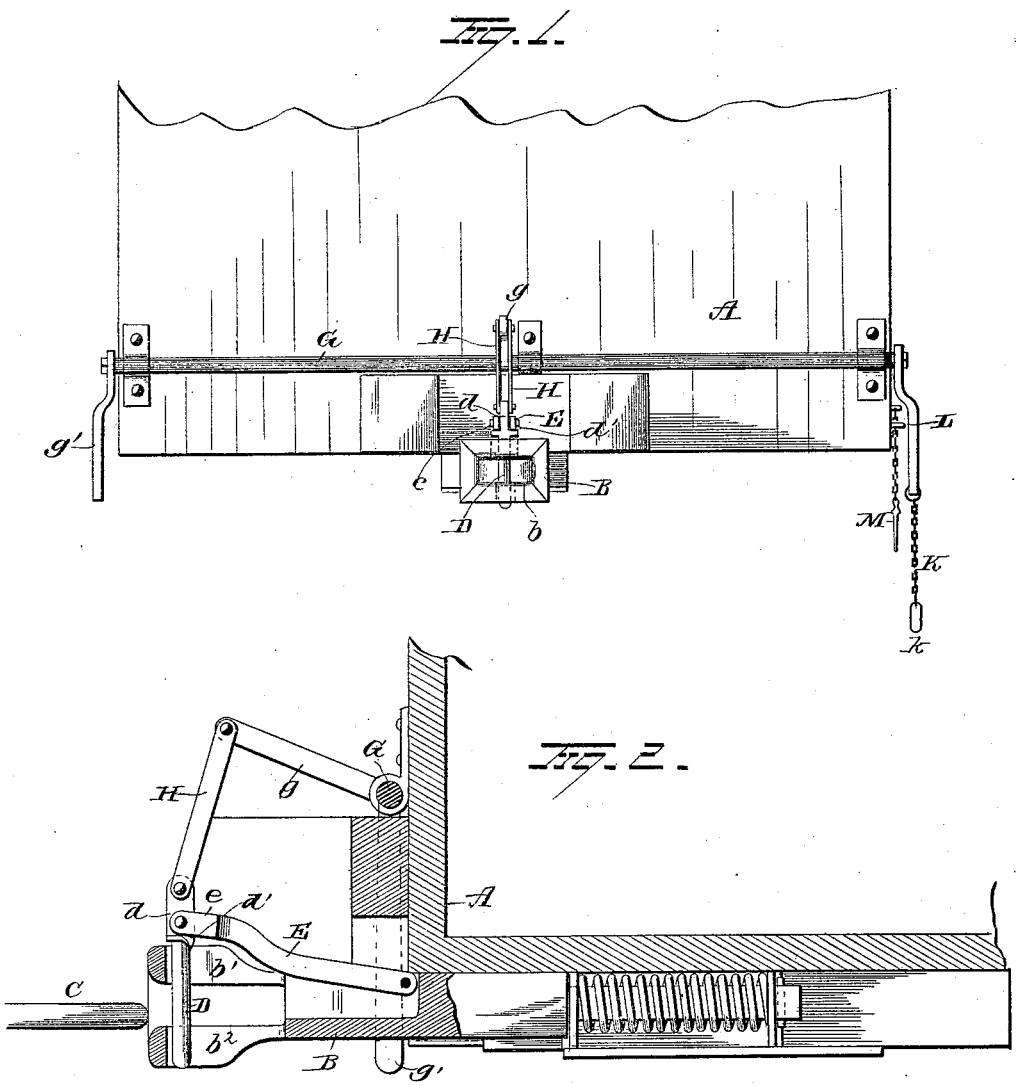

UNITED STATES PATENT OFFICE.

CHARLES DARIUS WOOLEY, OF WALDEN, NEW YORK.

CAR-COUPLING.

SPECIFICATION forming part of Letters Patent No. 346,630, dated August 3, 1886.

Application filed May 26, 1886. Serial No. 203,334. (No model.)

*To all whom it may concern:*

Be it known that I, CHARLES DARIUS WOOLEY, of Walden, in the county of Orange and State of New York, have invented certain new and useful Improvements in Car-Couplings; and I do hereby declare the following to be a full, clear, and exact description of the invention, such as will enable others skilled in the art to which it appertains to make and use the same.

My invention relates to an improvement in car-couplings.

The object is to provide a coupling which shall consist, essentially, of an ordinary link and pin, and hence admit of the substitution of the latter in case of accident or in coupling cars of other roads thereto.

A further object is to provide a coupling which shall be automatic in its action, and which will admit of the entering link being guided by the operator without danger to himself.

A further object is to provide a coupling which may be locked in coupled adjustment against any accidental or intentional displacement, except by breaking or the consent of the operator.

With these ends in view my invention consists in certain features of construction and combinations of parts, as will be hereinafter described, and pointed out in the claims.

In the accompanying drawings, Figure 1 is a view of one end of a car provided with the coupling. Fig. 2 is a longitudinal vertical section through the draw-head and approaching link. Fig. 3 represents the position of the pin after it has been tilted by the approaching link and is about to be raised, and Fig. 4 shows the link in a position to be operated upon by the guide-arm.

A represents the end of a car, to which the draw-head B is secured in any well-known or approved manner.

The draw-head B is provided with a bell-mouth, as is usual, the under lip, $b$, being rounded or beveled to admit of the link C hanging down in an oblique position when left to itself therein, but furnishing a bearing which will act as a fulcrum for elevating the free end of the link by bearing down on its end within the draw-head. The draw-head is further provided with an extended longitudinal vertical slot, $b'$, in its upper side, and with a corresponding elongated slot, $b^2$, in its lower side for the reception of the coupling-pin D. The coupling-pin D is of the same general form as that in common use in the ordinary form of pin-and-link coupling, excepting that its head $d$ is reduced and extended to form points of attachment for the guide and operating arms E and F. The guide-arm E is pivotally secured to the head of the coupling-pin a short distance below its upper end, the end of the arm E being preferably bifurcated, as shown at $e$, to receive the head of the pin between its branches. The opposite end of the arm E is pivotally secured to the draw-head at a distance back from its mouth. The pin D is also provided with one or a pair of oblique shoulders, $d'$, immediately beneath the end of the guide-arm E, which are adapted to engage the under side or edge of the arm E when the lower end of the pin has been tilted back from the mouth of the draw-head sufficiently to allow the end of the link to force it upwardly by horizontal pressure.

An operating-shaft, G, is journaled in suitable bearings across the end of the car, and provided with an operating-arm, $g$, which extends over the draw-head, its free end being about over the position which the pin would naturally occupy when in coupled adjustment. The free end of the arm $g$ is connected with the upper end of the pin by a link or other suitable connection, H. The ends of the operating-shaft G are provided with handle-arms $g'$, for rocking the shaft G from either side of the car. The end of one of the arms $g'$ is provided with a chain, K, having a link or eye, $k$, adapted to be placed over a staple, L, in the side of the car, and a pin or padlock, M, is adapted to secure the chain to the staple, and hence prevent the movement of the arm $g'$ and operating-shaft G.

The coupling-link C is of the ordinary elongated form in common use. The parts are so arranged that the arms $g'$ on the ends of the operating-shaft will tend to hold the coupling-pin in coupled position in the draw-head by their gravity, requiring to be swung away from the end of the car to elevate the pin or uncouple.

The approaching link when it first engages the coupling-pin will tilt it until the shoulders $d'$ engage the under side or edge of the guide-arm E, when the continued pressure will lift the pin and allow the link to slide beyond it in the draw-head. The weight of the pin and arms E, $g$, and $g'$ will tend to automatically return the pin to its coupled position, and the coupling will be complete. The link, resting in the approaching or stationary draw-head, may have its free end elevated or depressed by rocking the shaft G, and thereby causing the guide-arm E to press heavily or lightly on the end of the link within the draw-head. This manipulation of the link from the side of the car or out of the way of danger is an important advantage.

The form of coupling shown and described may be applied to either freight or passenger cars, but is well adapted to use on freight-cars.

In case of accident or possible derangement, an ordinary link and pin can be substituted without delay, and a stray car on any other road could be coupled with any other car where the ordinary link and pin are used.

It is evident that the means for operating the pin might be somewhat varied in form and arrangement to suit different forms of cars without departing from the spirit and scope of my invention; hence I do not wish to limit myself strictly to the construction herein set forth; but, Having fully described my invention, what I claim as new, and desire to secure by Letters Patent, is—

1. In a car-coupling, the combination, with a coupling-pin suspended from a rock-arm, of a guide-arm pivotally secured to the head of the coupling-pin, and adapted to swing therewith and limit the tilting motion of the pin when engaged by the approaching link, substantially as set forth.

2. In a car-coupling, the combination, with a coupling-pin suspended from a rock-arm and provided with a shoulder-bearing at the base of its head, of a vibrating guide-arm pivotally secured to the coupling-pin between the said shoulder and point of suspension, and adapted to engage the shoulder and thereby limit the tilting motion of the pin, substantially as set forth.

3. In a car-coupling, the combination, with a gravity coupling-pin adapted to retain one end of the link within the draw-head, of a vibrating arm pivotally secured to the head of the coupling-pin, and means for increasing or diminishing the pressure of said arm on the end of the link, and thereby elevating or depressing the free end of the link, substantially as set forth.

4. In a car-coupling, the combination, with a rock-shaft provided with an arm adapted to operate the coupling-pin, of a handle arm or lever for rocking the shaft, and a lock for securing the shaft against rotation, and hence the pin from uncoupling, substantially as set forth.

5. In a car-coupling, the combination, with the draw-head provided with the slots in its upper and under sides and the coupling-pin with its shoulders, of the guide-arm pivotally secured to the coupling-pin and draw-head, and the rock-shaft with its operating-arm connected with the pin by a link, the whole constructed and operating substantially as set forth.

In testimony whereof I have signed this specification in the presence of two subscribing witnesses.

CHARLES DARIUS WOOLEY.

Witnesses:
C. W. SADLIER,
W. C. STEVENS.